No. 862,627. PATENTED AUG. 6, 1907.
W. A. FLOWERS.
ROTARY VALVE FOR STEAM ENGINES.
APPLICATION FILED DEC. 22, 1906.
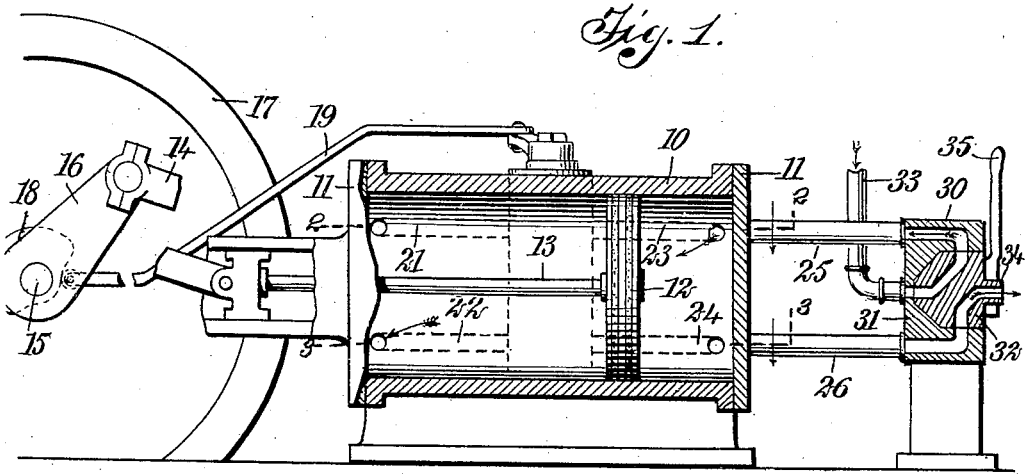
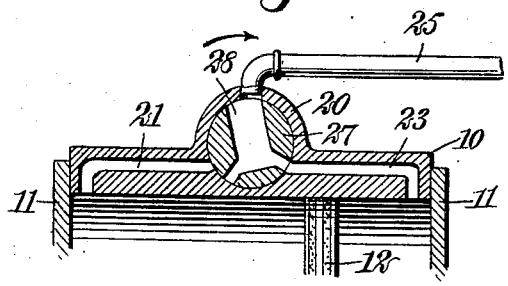
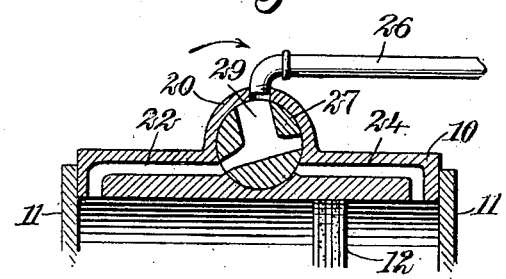
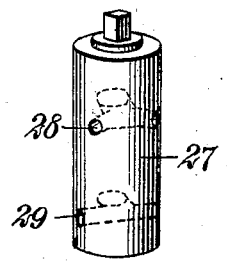
WITNESSES
INVENTOR
William A. Flowers
BY
ATTORNEYS

UNITED STATES PATENT OFFICE.

WILLIAM A. FLOWERS, OF ABERDEEN, WASHINGTON.

ROTARY VALVE FOR STEAM-ENGINES.

No. 862,627.  Specification of Letters Patent.  Patented Aug. 6, 1907.

Application filed December 22, 1906. Serial No. 349,048.

*To all whom it may concern:*

Be it known that I, WILLIAM A. FLOWERS, a citizen of the United States, and a resident of Aberdeen, in the county of Chehalis and State of Washington, have invented a new and Improved Rotary Valve for Steam-Engines, of which the following is a full, clear, and exact description.

This invention relates to certain improvements in steam engines, and more particularly to the means employed for controlling the admission and exhaust of the steam from the piston cylinder.

The object of the invention is to provide a single rotary valve operated from the crank shaft and adapted to be oscillated by a cam or eccentric located thereon.
My invention also relates to certain improved means whereby the engine may be more easily reversed and controlled.

Reference is to be had to the accompanying drawings forming a part of this specification, in which similar characters of reference indicate corresponding parts in all the figures, in which Figure 1 is a longitudinal section of a portion of the engine cylinder and reversing valve; Fig. 2 is a longitudinal section on the line 2—2 of Fig. 1; Fig. 3 is a longitudinal section on the line 3—3 of Fig. 1; and Fig. 4 is a perspective view of the cylinder valve.

In the specific embodiment of my invention which I have illustrated in the drawings, I employ a piston cylinder 10 having cylinder heads 11, a piston 12, and piston rod 13, as in all common forms of reciprocating steam engines. The piston 12 is secured to a connecting rod 14, and the latter is connected to the crank shaft 15 by means of a crank 16. The crank shaft carries the balance wheel 17 and a cam 18, the latter being adapted to engage with a valve rod 19 for operating the main steam valve.

The engine cylinder 10 is provided with a cylindrical valve casing 20 extending across the main cylinder and having its axis at right angles to the axis of said main cylinder. The valve casing communicates with the piston cylinder by means of four passages 21, 22, 23 and 24, two of these, 21 and 22, extending to one end of the piston cylinder, while the other two, 23 and 24, extend to the opposite end. The passages 21 and 23 extending in opposite directions are preferably in alinement, while the passages 22 and 24 are also in alinement and extend parallel to the passages 21 and 23. The valve casing 20 is provided with two ports leading to the outside, and these two ports are in alinement with the two pairs of passages, and two pipes 25 and 26 lead to these ports and serve as the inlet and exhaust pipes for the steam.

Within the valve casing 20 is a cylindrical valve plug 27 having passages therein for controlling the flow of steam to and from the piston cylinder. One of these passages 28 extends through the valve plug in the same plane as the passages 21 and 23 and the pipe 25, while the other passage 29 lies in the same plane as the passages 22 and 24 and the pipe 26. Each of these passages is composed of three branches, each extending from the circumference of the valve plug to the center thereof, and all the branches of each passage communicate at said center. One of the branches is of substantially twice the size of either of the other branches and is designed to communicate with the port in the outer wall of the valve casing, while the other two branches are designed to communicate alternately with two of the passages leading to the ends of the piston cylinder. The branches of the passage 28 are similar to the branches of the passage 29, the difference being in the distances between the two smaller branches of the respective passages, the difference being such that while the larger branch of each passage is at all times in communication with its port in the outer wall of the valve casing, the smaller branch of one passage leads to one end of the cylinder at the time that the smaller branch of the other passage leads to the opposite end of the cylinder. One of the pipes, as, for instance, pipe 25, may lead directly to the throttle valve, while the other pipe, as, for instance, 26, may lead directly to the condenser, but, preferably, I connect both pipes to a reversing valve 30, whereby the engine may be readily reversed. This reversing valve comprises a valve casing 31 and a valve plug 32 with passages whereby the main steam supply pipe 33 and the main steam exhaust 34 may each be made to communicate with either of the pipes 25 or 26. The structure of this reversing valve is substantially the same as that illustrated and claimed in my co-pending application, Serial No. 309,088, filed March 31, 1906.

In the operation of my improved steam engine, the reversing valve is set in the desired position by means of a lever 35, and as this valve may also serve as the throttle valve, the steam will be admitted through one of the pipes leading to the engine, as, for instance, the pipe 25. With the valve plug 27 in the position shown in Fig. 2, the steam escapes through the passages 28 and 23 into one end of the cylinder, while by reason of the differences in the angle of the passages 28 and 29, the latter will serve to permit the escape of steam from the opposite end of the cylinder through the passage 22 and the pipe 26. As the piston is forced to the opposite end of the cylinder, the crank shaft and cam 18 are caused to rotate and the valve plug 27 is oscillated a short distance. Due to the larger size of one branch of each of the passages 28 and 29, said passages still communicate with the pipes 25 and 26, but the smaller branches of each passage are caused to communicate with the opposite end of the cylinder, whereby the supply of steam is shut off from one end of the cylinder and delivered to the opposite end, the corresponding exhaust port being simultaneously operated. By varying the sizes and location of the branches of the passages, the supply of steam to the cylinder may be cut off at any point in the stroke that it is desired, and the exhaust may be permitted throughout the entire stroke or through only the desired portion thereof. By means of the reversing valve the supply of steam may be delivered through either the pipe 25 or the pipe 26, and the direction of the engine thus controlled at will. As the passages in the reversing valve only communicate at two given positions of said valve and are entirely closed when said valve is in any other position, it is evident that only a single valve need be provided and this valve serve both as the throttle valve and as the reversing valve.

As the engine valve is of cylindrical form and rotates within the cylindrical casing the friction is much less than with the ordinary style valve, as it is subjected to practically no steam pressure. The cost and weight of the valve is very materially reduced, and less power is therefore required to run the engine.

Various changes may be made in the specific construction of my invention, as the device illustrated constitutes merely one embodiment thereof.

Having thus described my invention, I claim as new and desire to secure by Letters Patent:

1. An engine, comprising a working cylinder, a valve chamber adjacent thereto and having a plurality of ports in its wall, said working cylinder being provided with conduits connecting certain of said ports with the opposite ends of said working cylinder, and a valve plug within said valve cylinder and provided with a plurality of radial passages, one of said passages adapted to serve as an inlet port and another as an exhaust port, and each of said passages having a plurality of branches, one of said branches communicating at all times with a port in the wall of the valve cylinder and the other branches adapted to be placed alternately in communication with the conduits leading to the opposite ends of the working cylinder.

2. An engine, comprising a working cylinder and a cylindrical valve chamber adjacent thereto, conduits connecting said valve chamber with each of the two opposite ends of the working cylinder and adapted to serve as inlet passages, conduits connecting said valve chamber to the opposite ends of said working cylinder and adapted to serve as exhaust passages, and a rotary valve plug in said valve chamber having a radial passage adapted to be placed alternately in communication with each of said inlet conduits and a passage adapted to be placed alternately in communication with the exhaust passages, one of said passages of the plug being in communication with the source of supply at all times and the other of said passages being in communication with the exhaust at all times.

3. A steam engine, comprising a piston cylinder, a valve cylinder integral therewith and having a plurality of ports in its outer wall, the wall of said piston cylinder being provided with parallel longitudinal passages connecting the valve cylinder with the ends of the piston cylinder, and a cylindrical valve plug within said valve cylinder and provided with a plurality of radial passages, one of said passages adapted to serve as an inlet port and another as an exhaust port, and each of said passages having a plurality of branches, one of said branches communicating at all times with a port in the wall of the valve cylinder and the other two branches adapted to be placed alternately in communication with the longitudinal passages of the piston cylinder.

In testimony whereof I have signed my name to this specification in the presence of two subscribing witnesses.

WILLIAM A. FLOWERS.

Witnesses:
  R. M. ABEL,
  HATTIE GIESY.